United States Patent [19]

Greenlee et al.

[11] Patent Number: 5,553,223
[45] Date of Patent: Sep. 3, 1996

[54] METHOD AND SYSTEM OF SELECTIVELY TRANSMITTING DISPLAY FORMATS AND DATA BETWEEN A HOST COMPUTER AND AN INTELLIGENT TERMINAL

[75] Inventors: Russell L. Greenlee, Denver; James H. Alexander, Highlands Ranch; Emilie A. Young; Gary M. Smithrud, both of Boulder, all of Colo.

[73] Assignee: U S West Advanced Technologies, Inc., Englewood, Colo.

[21] Appl. No.: 73,973

[22] Filed: Jun. 8, 1993

Related U.S. Application Data

[63] Continuation of Ser. No. 503,735, Apr. 3, 1990, abandoned.

[51] Int. Cl.$^6$ .................................................. G06F 15/17
[52] U.S. Cl. .............. 395/155; 395/200.05; 395/200.09; 395/200.1; 364/230.4; 364/230.5; 364/242.4; 364/260.1; 364/284.2; 364/284.4; 364/286; 364/DIG. 1
[58] Field of Search ...................... 395/800, 200, 395/325, 600, 155, 156, 157, 159, 200.01, 200.03, 200.04, 200.05, 200.09, 200.1, 286; 364/403, 406, 407, 408, 419, 230.4, 230.5, 241.9, 242.4, 242.5, 260, 260.1, 284.2, 284.4, 286.1

[56] References Cited

U.S. PATENT DOCUMENTS

| | | | |
|---|---|---|---|
| 3,534,338 | 10/1970 | Christensen et al. | 395/800 |
| 4,641,274 | 2/1987 | Swank | 395/200 |
| 4,648,037 | 3/1987 | Valentino | 364/408 |
| 4,677,552 | 6/1987 | Sibley, Jr. | 364/408 |
| 4,901,223 | 2/1990 | Rhyne | 395/650 |
| 4,924,434 | 5/1990 | Christensen et al. | 395/275 |
| 4,941,091 | 7/1990 | Breault et al. | 364/406 |
| 5,008,853 | 4/1991 | Bly et al. | 395/153 |
| 5,025,373 | 6/1991 | Keyser, Jr. et al. | 364/408 |
| 5,065,347 | 11/1991 | Pajak et al. | 395/159 |
| 5,109,487 | 4/1992 | Ohgomori et al. | 395/200 |
| 5,129,056 | 7/1992 | Eagen et al. | 395/161 |
| 5,146,439 | 9/1992 | Jachmann et al. | 369/25 |
| 5,173,854 | 12/1992 | Kaufman et al. | 364/419.14 |
| 5,201,033 | 4/1993 | Eagen et al. | 395/155 |
| 5,276,801 | 1/1994 | Heyen et al. | 395/162 |

OTHER PUBLICATIONS

Article Entitled "The Blit: A Multiplexed Graphics Terminal" by (10–84) R. Pike, AT&T Bell Laboratories Technical Journal, vol. 63, No. 8.

Article Entitled "Hardware/Software Trade-Offs For Bitmap Graphics On The Blit" by R. Pike, et al., Software-Practice And Experience vol. 15(2), 131–151–(Feb. 1985).

Article Entitled "A Virtual Protocol Model For Computer-Human Interaction3[ by Jakob Nielsen", International Journal of Man–Machine Studies, 24, 301–312 (1986).

Article Entitled "Pi: A Case Study In Object-Oriented Programming" by T. A. Cargill, OOPSLA (1986) Proceedings (Sep. 1986).

Article Entitled "Applications Programming In Smalltalk-80" by Steve Burbeck, Copyright ©1986.

(List continued on next page.)

*Primary Examiner*—Thomas G. Black
*Assistant Examiner*—Jack M. Choules
*Attorney, Agent, or Firm*—Brooks & Kushman P.C.

[57] ABSTRACT

User interfaces are distributed between a host computer 10 and an intelligent terminal 12 for communication over a telecommunications network 14 requiring minimum bandwidth. Host user interfaces 18 resident in the host computer 10 are distributed as terminal user interface objects 32 to the terminal 12. Terminal user interface objects 32 are directly manipulated on the terminal 12 and communicated on a filtered basis to the host computer 10 by a terminal port controller 34. Messages from the terminal 12 are directed by a host dispatcher 26 to host user interfaces which communicate with the host processor 16. Output messages from the host are routed through host and terminal port controllers 20 and 34, a terminal dispatcher 40 to terminal user interface objects 32.

19 Claims, 5 Drawing Sheets

OTHER PUBLICATIONS

Article Entitled "Interaction Ergonomics, Control And Separation: Open Problems In User Interface Management" by Gilbert Cockton.

Information And Software Technology vol. 29, No. 4 (May 1987) Article Entitled "Comparison Of Window Systems" by Hal L. Stern BYTE (Nov. 1987).

Article Entitled "Disentagling Application And Presentation In Distributed Computing: Architecture And Protocol To Enable A Flexible, Common User Interface" by Michael J. Muller, IEEE Transactions On Systems, Man and Cybernetics, vol. 18, No. 4 (Jul./Aug. 1988).

Article Entitled "Operations Systems Computing Architecture" Technical Advisory, TA-SOS-000915, Issue 1 (Dec. 1988).

Article Entitled "Data Stream Definition" Part 1—Functional Specification (Appendix C—Guide For An Implementor) pp. 162–194 (Jan. 15, 1990).

Fig. 3

PhoneMail

| | List | Read | Write | Quit |

Sort by: Name ○  Subject ○  Date ○

| Name | Subject | Date | Time |
|---|---|---|---|
| Cari Avila | Hi there! | 6/13/89, | 2:44 PM |
| Jim Alexander | DB project | 6/13/89, | 3:01 AM |
| Russell Greenlee | Your inability to... | 6/13/89, | 3:17 AM |
| Emilie Young | It's been years. | 6/13/89, | 3:34 AM |
| Dave Smithrud | Dave? Dave's not... | 6/13/89, | 3:38 PM |
| Catherine Marshall | 1989 Accomplishments | 12/1/4, | 8:32 AM |
| Susan Steele | Weekly Calendar | 12/4/89, | 8:47 AM |
| Barbara Dyker | New Mail Address | 12/3/89, | 7:23 AM |
| Steve Coffin | NeXT machine | 12/2/89, | 4:56 AM |
| Mark Abel | David Kang's Phone... | 12/1/89, | 3:12 AM |
| Postmaster@CS.U... | Expired Addresses | 12/1/89, | 11:48 AM |
| Emilie Young | More mail messages | 12/6/89, | 2:04 PM |
| Gary_Olsen.Euro... | Report of Meeting | 12/6/89, | 2:50 PM |
| George Engelbeck | Video Editing Equi... | 12/6/89, | 2:32 PM |

Delete

Reply

Forward

*To select a letter, click on it with the mouse.*

Gateway

METHOD AND SYSTEM OF SELECTIVELY TRANSMITTING DISPLAY FORMATS AND DATA BETWEEN A HOST COMPUTER AND AN INTELLIGENT TERMINAL

This is a continuation of application Ser. No. 07/503,735 filed on Apr. 3, 1990 and now abandoned.

TECHNICAL FIELD

This invention relates to computers and terminals linked by a telecommunications network. More particularly, this invention relates to a method of distributing user interfaces between a host computer and an intelligent terminal to minimize delays caused by telecommunication data transmission and establish a general protocol for distributing user interfaces that are directly manipulated at the terminal.

BACKGROUND

This invention is directed to the problem of providing a telecommunications link between a host computer and one or more remote terminals. The long-standing problem precluding the efficient use of telecommunication networks for interfacing is the speed limitations on such systems.

In the prior art, communications between a host computer and terminals were conducted on a character-by-character basis with each character or small set of characters being directly communicated by the terminal to the host computer. Examples of simple character string communication protocols include Teletel, ASCII and VT100. In character level commands, the terminal sends characters embedded with formatting commands and receives characters from the host computer.

Recently, more sophisticated communications software has been developed by which simple drawing commands are communicated. Examples of such systems include X Windows and NAPLPS Systems. With the more sophisticated drawing command systems, the terminal sends drawing commands or commands to draw a line, etc. and receives events such as the condition of a mouse or key.

Many advances have been made in user interface technology including the use of windows, scrolling text, highlighting segments of a display screen, creating software buttons on the screen which are activated by a pointer, etc. Computer users have become familiar with such techniques and expect state of the art systems to include sophisticated user interfaces.

The problem with the use of such interface implementations when the terminal must communicate over a network made up of narrow bandwidth voice communication lines, or their equivalent, is the delay involved in the communication between the terminal and the host. This problem has been described as echoplexing. For example, echoplexing would occur when a terminal user using a pointer device, such as a mouse, clicks a mouse down to select an item from a list or to activate a soft button on a screen. After "clicking" the mouse, an appreciable period of time elapses, perhaps several seconds, while the mouse down command travels across the telecommunications network from the terminal to the host and back to the terminal. Only then is the terminal display updated to show the change in the interface when the mouse is clicked. One solution to this problem is to provide a wider bandwidth telecommunications network. However, this solution imposes considerable additional cost for network services.

The worst case scenario for echoplexing is encountered when a mouse is moved across the screen and commands are continuously transmitted to the host computer. As the mouse is moved across the screen, many unnecessary raw events such as mouse clicks in areas of the screen that are not selectable or typing of characters when no text field is active are still communicated to the host computer which unnecessarily burdens network performance.

Another cause of problems with host computers that are interconnected to terminals by a telecommunications network is the need to redundantly transmit information between the host and the terminal. To the extent that redundant transmissions can be eliminated, responsiveness of the network can be improved. Avoiding redundant transmission of information is the simplest way to limit bandwidth requirements, and increase responsiveness of the network. It has been estimated that 50 percent of the information transmitted from a host computer to a conventional terminal is redundant in that all user interface information must be retransmitted for re-display each time the display is called up by the user.

The smaller the sets of data are that are distributed between a host and a terminal, the more bandwidth it requires. For instance, when a host computer sends graphics instructions at a low device or character level, such as a bitmap image of a software button, the computer specifies each pixel's value in the image. This low level of communication is inefficient due to the quantity of data necessary to describe the object on the terminal. Improvements can be made by describing the button in terms of lines, rectangles, and text at a structured graphics level. Communications at the structured graphics level requires less bandwidth than device or character level representations. Transmissions of interfaces by the structured graphics representation results in a more compact description of the interface object.

Another problem encountered when a telecommunications network is used to connect a host computer to its terminals is relatively low efficiency in use of the host computer due to the low density of commands received by the host computer from a given terminal per unit of time. When the host computer receives small amounts of information such as character strings or simple line draw commands, a great deal of time is wasted between commands.

Software compatibility problems are sometimes encountered between a terminal and host computer in applications involving a host computer which provides telecommunications access to data stored in the host to terminals. When software is sold as a separate package for use on an intelligent terminal, there is no assurance that the host computer will be fully compatible with the software on the terminal. This problem is also encountered when host computer software is modified and a user has not installed corresponding revisions at the terminal. Consumers who purchase software that is not fully compatible or who fail to make revisions may not be able to enjoy the benefits from the host computer.

These and other problems and disadvantages are overcome and the above objects are achieved by the present invention as will be more fully described below.

SUMMARY OF THE INVENTION

The present invention relates to a system and method of controlling distributed user interfaces between the host computer and an intelligent terminal over a telecommunications network. The host computer and terminal are interconnected so as to have an on-line mode for data transmission between them, and an off-line mode in which no data is transmitted between them. A controller is provided for switching between the on-line and off-line modes.

The method includes the steps of generating data representing a user interface object in the host computer. Data representing the user interface object is then transmitted over the telecommunications network in the on-line mode to the intelligent terminal. Data representing the user interface object is stored in the terminal. User manipulated commands are entered into the user interface object utilizing the terminal in the off-line mode to modify said data representing the user interface object. The modified data representing a modified user interface object is transmitted from the terminal to the host computer over the telecommunications network. Data representing the user interface object remains resident on the terminal for repeated display without retransmission from the host computer.

According to one aspect of the invention, a controller for the communications protocol is provided which is responsive to a set of gating commands to handle and route communications transmissions between the host computer and the terminal.

According to another aspect of the present invention, host object representations in the host computer are communicated as terminal object representations to the terminal. When communications as to data manipulations utilizing the objects are sent between the host and the terminal, the communication may pass at a high level without the need for redundant transmission of the user interface objects. The user interface objects are generally mixed graphics and text screen display elements providing full user interface utilities at a terminal including scrolling, highlighting and software screen buttons actuated by a pointing device.

The present invention also relates to a method of transferring data between a host computer and an intelligent terminal via substantially identical distributed user interfaces. The host computer has stored data representing one or more host distributed interfaces. The host computer communicates with a terminal having one or more corresponding terminal distributed user interfaces. The terminal interfaces each replicate of one of the host interfaces which provides the basis for high level communication between the terminal and the host computer.

The host computer and terminal are connected in an on-line mode for data transmission therebetween, and in an off-line mode wherein no data is transmitted between them. Data is transferred between the host computer and the intelligent terminal by first displaying one of the terminal interfaces on the terminal. The terminal interface is directly manipulated on the terminal in the off-line mode to create a set of manipulation data representative of selections utilizing the selected terminal interface on the terminal. The manipulation data has a terminal address component which identifies the terminal interface to which it applies. The terminal interactively displays manipulation data locally including both transitory data and selected data. Transitory data is that data required for dynamic use of the terminal interface screen which is not ultimately to be processed by the host computer. For example, when a list is scrolled by a user on the interface items are viewed by the user and not selected. However, when an item from the list is selected, that item is immediately marked on the terminal and held by the terminal until the entire screen is ready to be processed by the host computer. A controller ports the selected data through a terminal port which is received by a host port of the host computer.

The selected data is sent to a host dispatcher means in the host computer which routes the selected data to one of the host interfaces, the one host interface being the one from which the terminal interface was replicated. The selected data is routed according to the terminal address component indicating the identity of the one terminal interface in which the selected data was created. The one host interface interacts with a processor in the host computer applying the selected data as received. The one host interface interacts with the processor as if the terminal interface were directly communicating with the host computer. The selected data is processed as applied to the host interface in the host computer to develop host output data. The host output data includes a host address component. The host output data is sent to one of the host interfaces. The host output data is sent from the host interface through the host port and onto the terminal port.

From the terminal port, the host output data is sent to a terminal dispatcher means in the terminal for routing the host output data to at least one of the terminal interfaces according to the host address component. One or more updated terminal interfaces are created based upon said one or more host interfaces in the host computer. The updated terminal interfaces are available on the terminal as if they had been in direct communication with the processor of the host computer.

In many instances, the output data of the host computer is returned to the same host interface which provided the selected data from the terminal, and the same terminal interface that was originally manipulated to create the selected data is updated by the host output data.

According to the invention, the user interface function may be selected at the terminal which is a host processor defined function. In this case, the selection of a function on the terminal is transmitted to the host computer from the terminal. When the function is activated on the terminal, the terminal can directly display the processor defined functionality through the dispatch means and also communicate the processor defined function to the host to match the dynamic functionality by communication through the terminal and host ports. An example of such a processor defined function would include the scroll text function, highlighting function or software screen buttons activated by a pointer device.

The host computer and terminal each have a controller means for filtering and routing communications between the host computer and the terminal in conjunction with the dispatcher means. The controller means are preferably associated with and may form part of the ports of the host computer and the terminal. The controller of the host computer checks the port periodically for communications from the terminal. The terminal controller periodically checks the terminal port for communications from the host computer. The controller functions to gate communications so that transitory data manipulation in either the host computer or the terminal are not sent over the communications network. Codes are used by the controller to mark filtered events that are transmitted over the telecommunications network.

The dispatch means includes a table index of user interfaces which allows for routing communications to all involved interfaces based upon an address component of the communication.

Another aspect of the invention includes the provision of a template manager means in the host computer and the terminal for providing and storing user interfaces. The template manager concept facilitates adapting the application, or host processor, to any type of interface simply and efficiently. For example, when a communication is received by the terminal from the host computer which calls for an update of a terminal user interface, the template manager makes available the terminal user interface from storage on the terminal. In the event that the terminal user interface is not available on the terminal, an object maker function is provided for checking the availability of a selected terminal user interface. If the selected user interface is not stored on the terminal, the selected user interface is created by downloading the desired user interface from the host by a parallel representation of the host user interface.

It is an object of the present invention to provide increased availability of sophisticated user interfaces that are distributed by and available on remote terminals which are usable over telecommunications networks for communication with a host computer.

One principle object of the present invention is to increase the responsiveness of terminals which communicate with a host computer. Echoplexing problems which had previously been associated with the user telecommunication length between terminals and host computers are avoided while still utilizing a narrow bandwidth telecommunications.

It is another object of the present invention to minimize the transmission of redundant messages over telecommunications networks by using matched host and terminal user interfaces. Once the user interfaces are communicated over the telecommunications network, they are stored and communication may proceed by merely identifying the involved user interfaces.

It is another object of the present invention to increase efficiency in the use of a host computer by increasing the density of commands per unit of time and fostering communications at a higher level.

It is also an object of the present invention to eliminate compatibility problems between software used in a host computer and a terminal which communicates with the host computer by distributing user interfaces from the host to the terminal that are user interfaces in the host computer.

These and other advantages and objects of the present invention are described in detail in the following detailed description in view of the attached drawings.

BRIEF DESCRIPTION OF THE DRAWINGS

FIG. 3 is a diagrammatic illustration of a display generated by the present invention;

DETAILED DESCRIPTION

Figure 1:
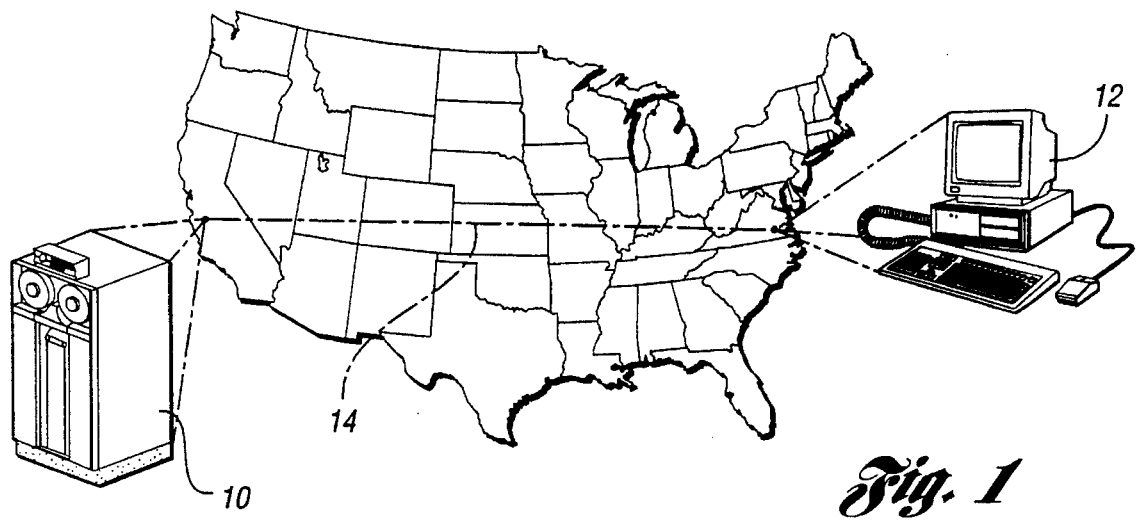
FIG. 1 is a schematic representation of a telecommunications network linking a host computer and a user terminal.

Referring now to FIG. 1, a host computer 10 is shown interconnected with a user terminal 12 by a telecommunications network 14.

Figure 2:
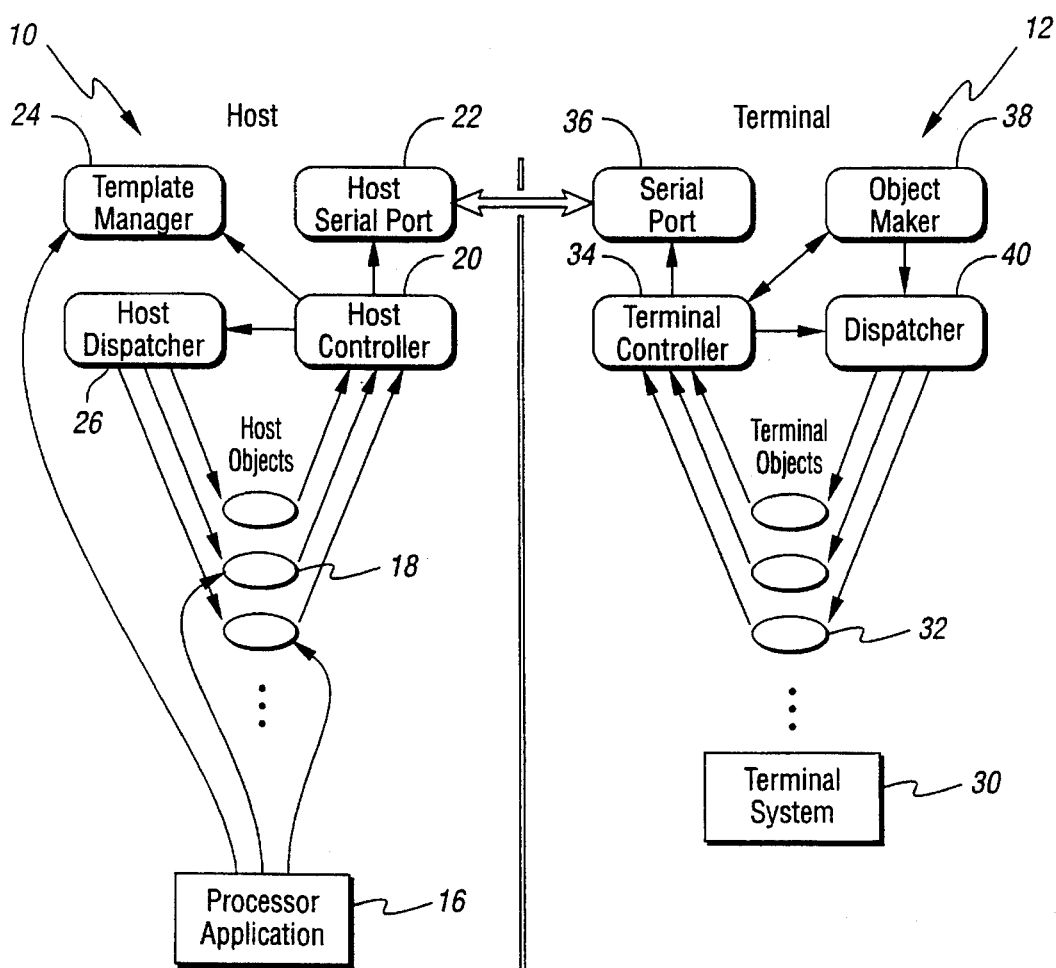
FIG. 2 is a diagrammatic representation of the host computer terminal architecture according to the present invention.

Referring to FIG. 2, the architecture of a host computer 10 and an intelligent terminal 12 is shown. The host computer has a processor 16 which performs database and computational functions based upon commands received from host objects 18 which are also referred to as host user interfaces. A host controller 20 is provided in the host computer 10 for controlling communications via the host serial port 22 with the terminal 12. The controller also controls a template manager 24 which creates host resident user interface objects and reads interface objects into memory from the processor 16. The host controller 20 also controls the host dispatcher 26 which includes a dispatch table index that stores information relating to all of the user interface objects 18 in the system.

A user interface is the totality of the controls and the feedback mechanisms that the user sees when using host processing. An interface object is part of a user interface such as a button, a list or a text field.

The terminal is an intelligent terminal having a system 30 which is capable of interacting with terminal objects 32 thereby allowing for remote processing of data as it is dynamically utilized in the terminal 12. A terminal controller 34 controls data communications through the serial port 36 to the host computer 10. The terminal controller interacts with the object maker 38.

The object maker 38 is responsible for creating new terminal resident user interface objects from the object templates received from the template manager 24. When the host computer 10 signals the terminal 12 to create a new terminal resident user interface object 32, it sends an object template descriptor to the terminal which obtains the proper object template from storage in the terminal system 30. If the terminal does not yet have the proper object template, the object maker requests a download of the object template from the template manager 24. The object is downloaded through the host controller 20 and the host serial port 22 to the serial port of the terminal 36 and the terminal controller 34 through the terminal dispatcher 40 which enters the template on the dispatcher index. The template is then available for use on the terminal 12.

Referring now to FIG. 3, an electronic mail display screen is shown to illustrate the capabilities of the invention. The display screen 50 includes a text field 52 which displays identifying information for a list of electronic mail items. A series of buttons 54 which are terminal resident user interface objects appear across the top of the display. When a user elects to select one of the objects, a pointer device such as a mouse, is located over the button 54 and selected by a mouse click. The user interface objects available on the exemplary electronic mail screen include displaying a list, reading individual items from the list, writing responses and ending communications. When the list button is actuated, the text field is filled with the list of available messages. As an alternative, the user could select an item from the list by a keyboard command.

Upon initialization of the electronic mail application, the application computer sends requests to the display buttons and fields. If the terminal computer has a local representation of that component, it is displayed immediately. When the terminal computer does not have a representation, it sends a request for a more complete description, or template, which the application computer returns. The screen representation and button interactions are initialized by the terminal computer. The host computer transmits the location and labels for buttons while the terminal displays the user interface object.

Operation of the system according to the present invention improves responsiveness of the system by proceeding as follows. When the user actuates the list button of the electronic mail application, the button is highlighted locally on the terminal, and the terminal alerts the host computer through the terminal port controller. To improve user interface responsiveness, list management, highlight and other user interface functions are locally controlled by the terminal. Only selected items of data are transmitted to the host computer. As a result of this architecture, the interaction proceeds at speeds acceptable to the user while providing the user with displays that are full featured user interfaces.

Figure 4:
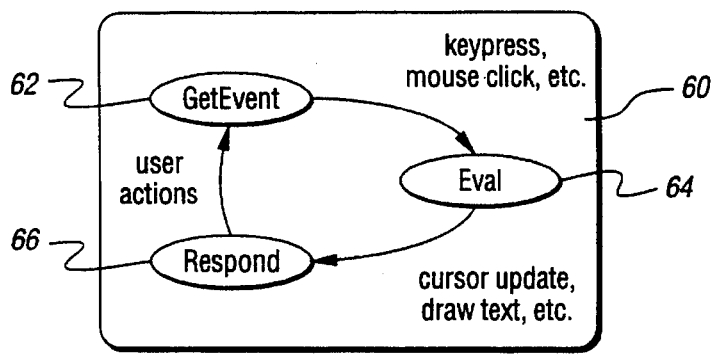
FIG. 4 is a diagrammatic representation of a user interface running on a single machine.
Figure 5:
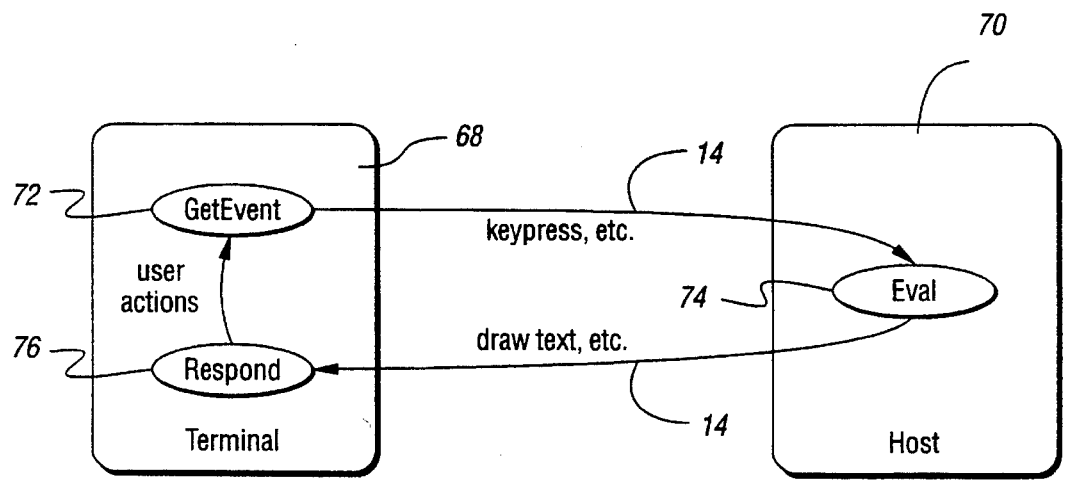
FIG. 5 is a diagrammatic representation of a user interface running on a non-intelligent terminal controlled by a remote host computer.
Figure 6:
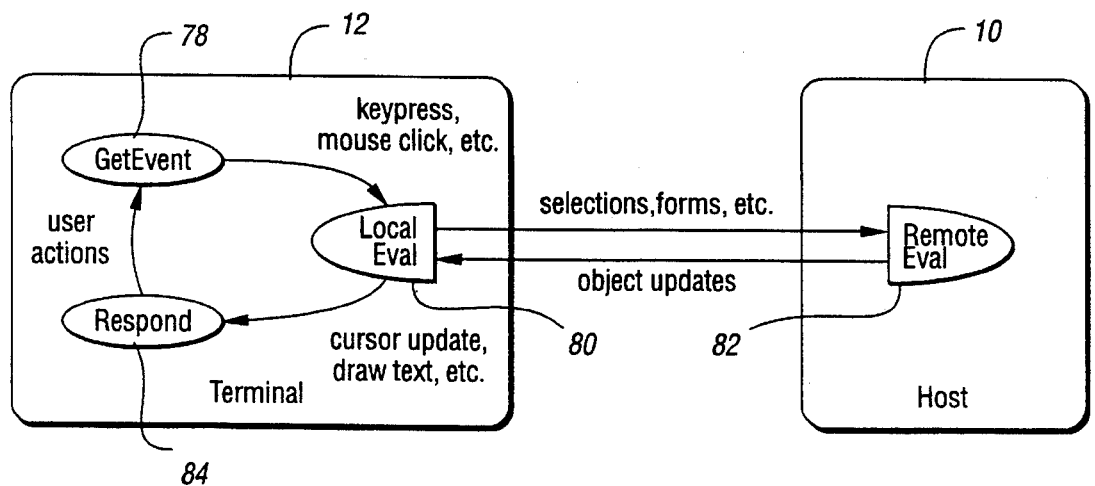
FIG. 6 is a diagrammatic representation of an intelligent terminal that splits the data analysis function between the host and the terminal in accordance with the present invention.

Referring now to FIGS. 4, 5 and 6, the concept of the invention is contrasted with prior approaches. Referring specifically to FIG. 4, an independent system 60 is shown which does not include any telecommunication network link. The independent system 60 is a typical user interface running on a single computer. The user interface includes a get event module 62 which checks for user actions by reading input devices and generating events. The evaluation module 64 generates an action that depends on the event selected in the get event module 62, the state of the user interface and the state of the application. A response module 66 displays the action generated by the evaluation module 64 for the user by means of an output device such as the screen, or for audio outputs, a speaker. The user completes the loop by generating new input action based on the interface response reported in the response module that are then provided to the get event module to complete the loop. In this conceptual model, there is no response time delay caused by signals being transferred to a telecommunications network.

Referring to FIG. 5, a conceptual model of a dumb terminal 68 interconnected to a host computer 70 by telecommunications network 14 is shown. The dumb terminal 68 includes the get event module 72 of the system which sends raw events such as key presses, mouse clicks, etc. to the evaluation module 74 is located in the host computer 70. The computer processes the raw events and sends raw output device primitive such as draw lines, generate text, etc. The response module 76 receives the raw output primitives from the host computer to display the action generated by the evaluation module. These then generate new input actions based on the interface response. Communication of raw events from the get event module to the evaluation module and communication of raw output device primitives from the host computer to the terminal over the telecommunications network 14 result in excessive delay which interferes with efficient use of the user interface.

Referring now to FIG. 6, an intelligent terminal 12 in communication with a host computer 10 by means of a network interface 14 is shown in accordance with the present invention. A get event module 78 is provided in the terminal which communicates raw events to a local evaluation module 80. Raw events such as key presses, mouse clicks, etc. are received by the local evaluation module and communicated on a filtered event basis to the remote evaluation module 82 in the host computer 10. The remote evaluation module 82 receives selections, forms and other entries with reference to the user interface templates from the local evaluation module. The remote evaluation module 82 sends object updates back as a high level form of communication to the local evaluation module. The local evaluation module 80 processes other raw events directly to the response module 84 for updating the interface without delays necessitated by the network 14. The local evaluation module 80 also directs fully processed object updates received from the host resident evaluation module 82 of the host 10 to the response module 84. The host resident evaluation module 82 responds by sending interface changes to the terminal resident local evaluation module 80.

Reduction in bandwidth requirements are achieved by the present invention by filtering events that must be communicated from the terminal to the host. In addition, the bandwidth requirements are reduced by providing higher level communications such as entire user interfaces instead of sending individual raw events such as key presses and mouse clicks. Considerable bandwidth requirements are imposed on a system if description of user interfaces are sent to the terminal by a bitmap representation of the desired image or simple graphics instructions.

Recently, transmission of structured graphics have permitted higher level representations of graphical images which reduce the bandwidth requirements for transmission of user interfaces. According to the present invention, higher level representations of user interfaces can be transferred without the need to instruct the terminal at the pixel level or even at the structured graphic level. Instead, a user interface object may be described by reference to the template distributed by the host computer to the terminal by specifying the identity of the interface element such as a button or text field, and then adding additional descriptors or codes to define additional information or status of that user interface element. It is not necessary to create the user interface element on a pixel basis or on a graphics description basis.

Further efficiencies are realized by the present invention by means of storing templates of user interfaces after they are distributed from the host computer to the terminal. When a user interface is initially transferred from the host to the terminal, all of the data necessary to form the user interface must be transferred. After the initial transfer, the user interface is stored for immediate display upon being called up by the object maker 38.

Figure 7:
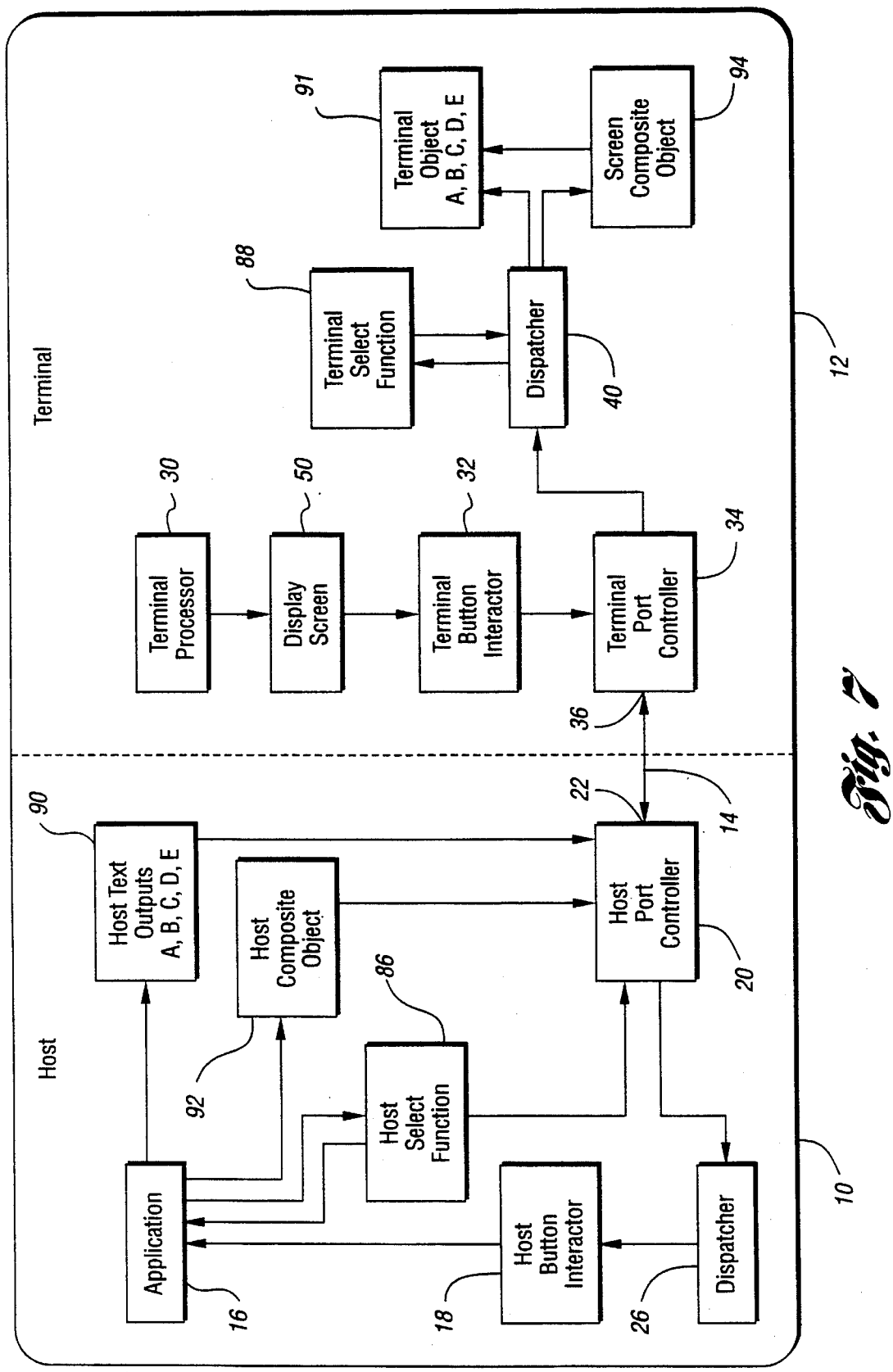
FIG. 7 is a diagrammatic representation of communication between a host computer and a terminal according to the present invention.

Referring now to FIG. 7, flow of information between the terminal and host computer is explained in detail. This example assumes that the session has been initiated and the necessary templates or user interface objects have been created in the terminal based upon the host resident objects. Distributed user interface operation is demonstrated by reference to a electronic mail prototype system. The user interface is in the condition shown in FIG. 3 with the text field 52 including the names and identifying information for various messages.

The cursor is located over the read button the screen. The terminal 30 controls the display screen 50 which shows the read button. The button interactor 32 of the terminal 12 sends a read message to the terminal port controller 34 which ports the read message through the serial port 36 to the serial port 22 of the host. The host port controller 20 sends the read message to the host dispatcher 26. The read message also includes the identification of the user interface object as the read button on the particular user interface currently displayed on the display screen 50. The read message is directed by the identification information to a host button interactor object in the host. The host button interactor 18 communicates with the processor 16 of the host computer 10 which processes the read instructions.

The host processor 16 inquires of the host select function for the rolling select function to obtain a list of all messages that were selected previously by the select function 88 on the terminal 12. The host select function 86 sends an inquiry message to the host port controller 20 which is sent via the host serial port 22 to the serial port 36 and terminal port controller 34. The terminal port controller 34 sends the inquiry message to the terminal dispatcher 40 which inquires of the terminal rolling select function 88 as to which items were selected from the list.

The list information message is returned to the terminal dispatcher 40, or alternatively directly to the terminal port controller 34, and in turn through the serial port 36 to the host port 22 and its associated controller 20. The list information message is then communicated from the host port controller 20 to the host select function 86 which sends the information onto the processor 16.

The processor 16 finds the text of each of the items selected by the user in the rolling select mode and distributes the text of the selected messages to the host text output templates, a plurality of text outputs can be printed onto host text output templates, such as outputs A through E as shown in the drawing. The host text objects are set up in the appropriate fields and forwarded as a text output message to the host port controller 20 and its associated serial port 22 for further transmission over the network 14 to the serial port 36 and terminal port controller 34. The terminal port controller 34 directs the text messages to the dispatcher 40 which sends the text message to individual text fields of the terminal text displays.

After all the text fields have been provided with the information contained in the messages to be read, the processor 16 instructs the host composite object 92 containing the read message interface objects with a draw message. The draw message is sent from the host composite object 92 to the host port controller 20 which sends the draw message over the telecommunications network 14 to the terminal port 36 and the terminal port controller 34. The draw message is then transmitted to the dispatcher 40 and the screen composite object 94. Each text object may then be instructed to draw themselves as controlled by the terminal processor 30.

The above example illustrates interaction between the host and terminal objects for one specified application. To provide different functions, only the application code must be modified. Many different functions can be performed according to the general procedure described above.

Figure 8:
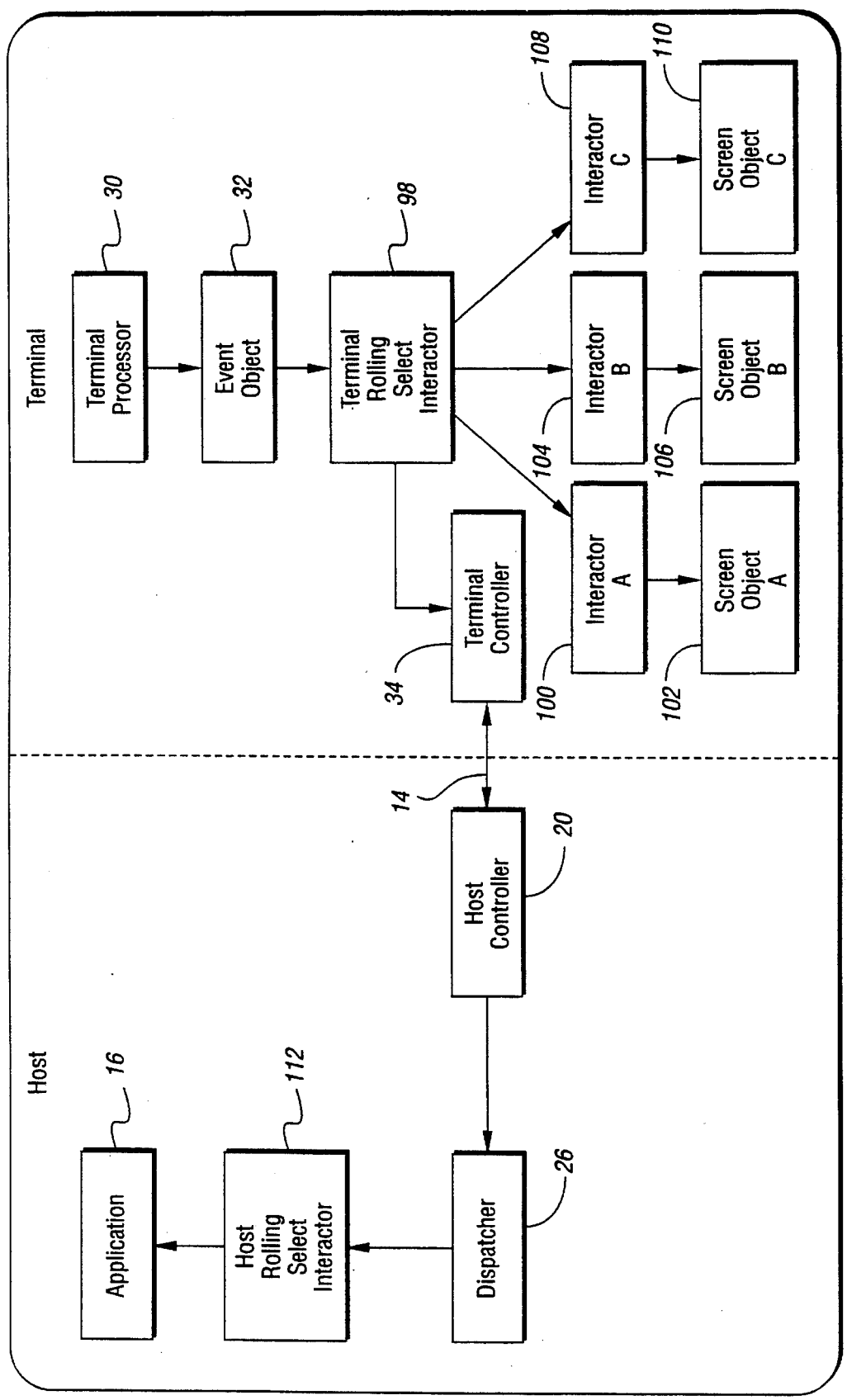
FIG. 8 is a diagrammatic representation of several communications between a host computer and a terminal featuring the local processing on the terminal according to the present invention.

Referring now to FIG. 8, the local processing function for a rolling screen select interaction is described in detail. It should be understood that any other interaction functions are also intended to be locally processed on the terminal until the user instructs the terminal to port the communication represented by the user interface object to the host computer.

The terminal processor 30 sets the user interface object 32. The user interacts with the user interface object 32 at terminal rolling select interactor 98. The user selects interactors A, B and C as the rolling select interacts with the terminal object 32. Interactor A 100 is selected and represented by screen object A 102. A second interactor B 104 is shown locally on the screen as screen object B 106 and interactor C 108 is shown on the screen as screen object C 110. When the user has selected all of the desired interactions, the message is sent to the terminal port controller 65 containing all of the information contained on the terminal object 32 which has been modified by interactors A, B and C. If any of the interactors are modified or deselected, they can be modified locally prior to transmission. When the interactor message is sent to the terminal port controller, communication across the telecommunication lines 14 are transmitted to the host port controller 20. The host dispatcher 26 in turn sets the host rolling select interactor 112. The host rolling select interactor communicates the interactor message to the host processor 16.

The above description of the best mode of practicing the invention is presented by way of example and not by way of limitation. Various changes and modifications may be made without departing from the present invention.

We claim:

1. For use with a host computer having a plurality of user interface objects corresponding to a plurality of user interfaces and an intelligent terminal capable of interacting with objects as well as creating and storing objects, said host computer and said intelligent terminal being interconnected over a telecommunications network in an on-line mode for data transmission therebetween and in an off-line mode wherein no data is transmitted therebetween, a method of processing and transmitting data corresponding to one of the plurality of user interface objects between the host computer and the intelligent computer, the method comprising the steps of:

determining whether the one of the plurality of user interface objects is stored in the intelligent computer;

if the one of the plurality of user interface objects is not stored in the intelligent computer, generating interface data representing the one of the plurality of user interface objects, the interface data providing full user interface utilities;

transmitting said interface data over the telecommunications network in the on-line mode to the intelligent terminal;

storing said interface data in the intelligent terminal;

modifying the interface data in real time with user manipulated commands and actions by utilizing the intelligent Terminal in the off-line mode to obtain transitory interface data and modified interface data, the transitory interface data representing user manipulations not requiring intervention from said host computer, and the modified interface data representing user manipulations resulting in an alteration of the user interface and requiring intervention from said host computer;

filtering said modified interface data from said transitory interface data in real time through the use of gating commands; and transmitting only the modified interface data upon a first occurrence of the modified interface data from the intelligent terminal to the host computer over the telecommunications network.

2. The method of claim 1 wherein identical serial port data representations are provided in the host computer and the intelligent terminal.

3. The method of claim 1 wherein parallel data representations of the one of the plurality of user interface objects are resident in the host computer and the intelligent terminal so that communication between said plurality of user interface objects may be transparent to the host computer and the intelligent terminal.

4. The method of claim 1 wherein said one of the plurality of user interface objects is a mixed graphics and text screen display.

5. The method of claim 1 wherein said one of the plurality of user interface objects is a portion of the terminal screen forming a software button actuated when a cursor is located at said portion of the screen.

6. The method of claim 1 wherein said one of the plurality of user interface objects is manipulated by a text scroll function command.

7. The method of claim 1 wherein said one of the plurality of user interface objects is manipulated by a highlight function command.

8. For use with a host computer having a plurality of user interface objects corresponding to a plurality of user interfaces and an intelligent terminal capable of interacting with objects as well as creating and storing objects, said host computer and said intelligent terminal being interconnected over a telecommunications network in an on-line mode for data transmission therebetween and in an off-line mode wherein no data is transmitted therebetween, a system for processing and transmitting data corresponding to one of the plurality of user interface objects between the host computer and the intelligent computer, the system comprising:

means for determining whether the one of the plurality of user interface objects is stored in the intelligent computer;

means for generating interface data representing the one of the plurality of user interface objects, said one of the plurality of user interface objects providing full user interface utilities and comprising template data and manipulation data;

means for transmitting said interface data over the telecommunications network in the on-line mode from the host computer to the intelligent terminal;

means for storing said interface data in the intelligent terminal;

means for modifying the manipulation data in real time at the intelligent terminal in the off-line mode creating transitory data and modified interface data, the transitory interface data representing modifications not requiring intervention from said host computer, and the modified interface data representing modifications resulting in an alteration of the user interface and requiring intervention from said host computer; and means for transmitting only the modified interface data from the intelligent terminal to the host computer over the telecommunications network while retaining a copy of said template data and modified data resident on the intelligent terminal without retransmission of the template data or the transitory data to the host computer, said means for transmitting the modified interface data having means for gating transmissions from a controller in the intelligent terminal and a controller in the host computer which regulates transmissions in real time between the host computer and the intelligent terminal to permit transmission of only modified interface data upon a first occurrence of the modified interface data.

9. The system of claim 8 wherein said interface data in the host computer and intelligent terminal are identical except for location and address components so that transmission of the interface data is non required in order to transmit the modifications of the user interface data between the host computer and the intelligent terminal.

10. The system of claim 8 wherein said one of the plurality of user interface objects is a mixed graphics and text screen display.

11. The system of claim 8 wherein said one of the plurality of user interface objects is a portion of the terminal screen forming a software button actuated when a cursor is located at said portion of the screen.

12. The system of claim 8 wherein said one of the plurality of user interface objects is manipulated by a text scroll function command.

13. The system of claim 8 wherein said one of the plurality of user interface objects is manipulated by a highlight function command.

14. A method of transferring data over a telecommunications network between a host computer and an intelligent terminal via distributed user interface objects, said host computer having stored data in the form of objects representing one or more host user interfaces, said intelligent terminal capable of interacting with objects and having stored data in the form of objects representing one or more terminal user interfaces, said terminal interfaces each being parallel representations of one of said host interfaces, said host computer and said intelligent terminal being connected in an on-line mode for data transmission therebetween and in an off-line mode wherein no data is transmitted therebetween, the method comprising the steps of:

displaying one of the terminal interfaces on the intelligent terminal, said terminal interface providing user interface utilities and including template data and manipulation data;

directly manipulating in real time said one terminal interface on the intelligent terminal in the off-line mode to create a set of manipulation data representative of selections performed on said terminal interface on the intelligent terminal and comprising transitory interface data and modified interface data, the transitory interface data representing manipulations not requiring intervention from said host computer, and the modified interface data representing manipulations resulting in an alteration of the user interface and requiring intervention from said host computer, said manipulation data further having a terminal address component which identifies the terminal interface to which it applies;

interactively displaying in real time at the intelligent terminal said manipulation data;

selectively transmitting in real time only the modified interface data from the intelligent terminal through a terminal port controller to the host computer without transmitting the transitory data, the modified interface data transmitted upon a first occurrence of the modified interface data;

receiving said modified interface data at the host computer through a host port controller of the host computer;

sending said modified interface data from the host port controller to a host dispatcher means in the host computer for routing said modified interface data to one of said host interfaces, said one host interface being the one from which said one terminal interface was replicated according to the terminal address component indicating the identity of said one terminal interface in which said modified interface data was created;

interacting with said one host interface with a processor in the host computer and applying said modified interface data as received, wherein said one host interface interacts with said processor as if said one terminal interface was directly communicating with the host computer;

processing said modified interface data in a host computer application processor in the host computer to develop host output data, said host output data having a host address component;

sending said host output data from said host computer application processor to one or more of said host interfaces;

sending said host output data from said one or more host interfaces to the host port controller which in turn sends the output data to the terminal port controller; and sending said host output data from the terminal port controller to a terminal dispatcher means in the intelligent terminal for routing said host output data to at least one of said terminal interfaces of said one or more host interfaces according to the host address component to create one or more updated terminal interfaces, wherein said one or more terminal updated interfaces are available on the intelligent terminal as if they had been in direct communication with the processor.

15. The method of claim 14 wherein said host output data is returned to the same terminal interface that was manipulated in the step of directly manipulating the terminal interface.

16. The method of claim 14 wherein said step of directly manipulating comprises selecting a host processor controlled function, and wherein said interactively displaying step comprises displaying terminal initiated manipulations of the host processor controlled function locally through the terminal dispatcher means while communicating with the host computer through the host and terminal port controllers.

17. The method of claim 14 wherein said step of selectively transmitting data through the terminal port controller is implemented by coding said manipulated data as to whether it is to be communicated over the network or processed locally.

18. The method of claim 14 wherein said host dispatcher means and said terminal dispatcher means each have a table index of user interfaces which record host address and terminal address components of host user interfaces and terminal user interfaces, respectively.

19. The method of claim 14, further comprising the step of storing terminal interfaces and logging said terminal interfaces in a template manager which makes said terminal interfaces available when requested by the host computer if said terminal interface is present on the intelligent terminal; if the terminal interface is not present, the template manager instructs the host computer to download the requested terminal interface by a parallel representation of the corresponding host user interface in the host computer.

* * * * *